(12) United States Patent
Juillet et al.

(10) Patent No.: US 11,888,278 B2
(45) Date of Patent: Jan. 30, 2024

(54) COLD SHRINK CORE

(71) Applicant: Richards Mfg. Co., A New Jersey Limited Partnership, Irvington, NJ (US)

(72) Inventors: Christopher A Juillet, Warren, NJ (US); Bruce Bier, Warren, NJ (US); Jeffrey Madden, Bernardsville, NJ (US)

(73) Assignee: Richards Mfg. Co., Irvington, NJ (US)

( * ) Notice: Subject to any disclaimer, the term of this patent is extended or adjusted under 35 U.S.C. 154(b) by 0 days.

(21) Appl. No.: 17/656,099

(22) Filed: Mar. 23, 2022

(65) Prior Publication Data
US 2022/0311157 A1    Sep. 29, 2022

Related U.S. Application Data

(60) Provisional application No. 63/165,424, filed on Mar. 24, 2021.

(51) Int. Cl.
| | |
|---|---|
| *H01R 4/70* | (2006.01) |
| *H02G 15/18* | (2006.01) |
| *H01R 43/00* | (2006.01) |

(52) U.S. Cl.
CPC ............ *H01R 4/70* (2013.01); *H01R 43/005* (2013.01); *H02G 15/18* (2013.01)

(58) Field of Classification Search
CPC .......... H01R 4/02; H01R 4/70; H01R 43/005; H01B 7/02; H01B 7/04; H01B 7/06; H01B 7/08; H01B 7/24; H02G 15/02; H02G 15/18

USPC ... 174/73.1, 74 A, 74 R, 78, 79, 84 R, 88 R, 174/91, 93

See application file for complete search history.

(56) References Cited

U.S. PATENT DOCUMENTS

| | | |
|---|---|---|
| 3,980,374 A | 9/1976 | Fallot |
| 4,019,250 A | 4/1977 | Bassett |
| 4,499,129 A | 2/1985 | Kridl |
| 4,501,927 A | 2/1985 | Sievert |
| 4,520,229 A | 5/1985 | Luzzi |
| 4,581,265 A | 4/1986 | Follette |
| 4,849,580 A | 7/1989 | Reuter |
| 5,230,640 A | 7/1993 | Tardif |
| 5,365,020 A | 11/1994 | Vallauri |
| 5,486,388 A | 1/1996 | Portas |
| 5,753,861 A * | 5/1998 | Hansen ............... H02G 15/1826 174/136 |

(Continued)

FOREIGN PATENT DOCUMENTS

CA    2652684 A1    8/2010

*Primary Examiner* — William H. Mayo, III
(74) *Attorney, Agent, or Firm* — Nixon Peabody LLP

(57) ABSTRACT

A support core system for deploying a cold shrink rubber over a cable splice connection in an electrical distribution system. The support core system includes a first solid core, a second solid core, and a polyethylene terephthalate (PET) film. The first solid core is configured to fit over a cable in the electrical distribution system and hold a first portion of the cold shrink rubber in an expanded state. The cable includes the cable splice connection. The second solid core is configured to fit over the cable and hold a second portion of the cold shrink rubber in an expanded state. The PET film is positioned between the cold shrink rubber and each of the first solid core and the second solid core.

19 Claims, 7 Drawing Sheets

(56) References Cited

U.S. PATENT DOCUMENTS

| | | | | |
|---|---|---|---|---|
| 5,856,634 | A * | 1/1999 | Borgstrom | H02G 15/1826 174/138 F |
| 5,985,062 | A | 11/1999 | Vallauri | |
| 6,103,975 | A * | 8/2000 | Krabs | H02G 15/1833 174/74 A |
| 6,111,200 | A | 8/2000 | De Schrijver | |
| 6,171,669 | B1 | 1/2001 | Vallauri | |
| 6,245,999 | B1 * | 6/2001 | Costigan | H01R 4/70 174/74 A |
| 6,309,721 | B1 | 10/2001 | Gladfelter | |
| 6,342,679 | B1 | 1/2002 | Portas | |
| 6,359,226 | B1 | 3/2002 | Biddell | |
| 6,472,600 | B1 | 10/2002 | Osmani | |
| 6,576,846 | B2 | 6/2003 | Portas | |
| 6,884,124 | B1 | 4/2005 | Luzzi | |
| 6,991,484 | B2 | 1/2006 | Luzzi | |
| 7,195,807 | B2 | 3/2007 | Balconi | |
| 7,228,626 | B2 | 6/2007 | Luzzi | |
| 7,381,103 | B2 | 6/2008 | Luzzi | |
| 7,431,599 | B2 | 10/2008 | Luzzi | |
| 7,511,222 | B2 * | 3/2009 | Taylor | H02G 15/1826 29/605 |
| 7,517,260 | B2 | 4/2009 | Luzzi | |
| 7,588,469 | B2 | 9/2009 | Luzzi | |
| 7,728,227 | B2 | 6/2010 | Portas | |
| 7,838,770 | B2 | 11/2010 | Portas | |
| 7,872,197 | B2 | 1/2011 | Vallauri | |
| 7,985,093 | B2 | 7/2011 | Luzzi | |
| 8,070,509 | B2 | 12/2011 | Luzzi | |
| 8,119,193 | B2 | 2/2012 | Vallauri | |
| 8,187,025 | B2 | 5/2012 | Luzzi | |
| 8,221,155 | B2 | 7/2012 | Luzzi | |
| 8,273,200 | B2 | 9/2012 | Portas | |
| 8,502,076 | B2 * | 8/2013 | Luzzi | H01R 4/72 174/93 |
| 8,555,499 | B2 | 10/2013 | Portas | |
| 8,697,995 | B2 | 4/2014 | Vallauri | |
| 9,048,638 | B2 | 6/2015 | Madden | |
| 9,059,581 | B2 | 6/2015 | Luzzi | |
| 9,071,004 | B2 | 6/2015 | Madden | |
| 9,184,576 | B2 | 11/2015 | Vallauri | |
| 9,270,031 | B2 | 2/2016 | Portas | |
| 9,392,709 | B2 | 7/2016 | Luzzi | |
| 9,455,524 | B2 | 9/2016 | Madden | |
| 9,613,735 | B2 | 4/2017 | Portas | |
| 9,651,173 | B2 | 5/2017 | Juillet | |
| 9,762,046 | B2 | 9/2017 | Madden | |
| 9,923,285 | B2 | 3/2018 | Juillet | |
| 10,211,611 | B2 | 2/2019 | Bier | |
| 10,230,222 | B2 | 3/2019 | Bertini | |
| 10,256,620 | B2 | 4/2019 | Madden | |
| 10,522,983 | B2 | 12/2019 | Bertini | |
| 10,522,984 | B2 | 12/2019 | Bertini | |
| 10,574,041 | B2 | 2/2020 | Bier | |
| 10,840,678 | B2 | 11/2020 | Bertini | |
| 11,276,513 | B2 | 3/2022 | Luzzi | |
| 2003/0079902 | A1 | 5/2003 | Luzzi | |
| 2006/0272842 | A1 | 12/2006 | Vallauri | |
| 2007/0275194 | A1 | 11/2007 | Suzuki | |
| 2008/0121408 | A1 * | 5/2008 | Portas | H02G 15/18 174/79 |
| 2008/0135288 | A1 | 6/2008 | Taylor | |
| 2009/0230090 | A1 | 9/2009 | Luzzi | |
| 2009/0298342 | A1 | 12/2009 | Luzzi | |
| 2010/0116638 | A1 | 5/2010 | Luzzi | |
| 2010/0193235 | A1 | 8/2010 | Taylor | |
| 2010/0200292 | A1 | 8/2010 | Luzzi | |
| 2012/0273246 | A1 | 11/2012 | Luzzi | |

* cited by examiner

COLD SHRINK CORE

CROSS-REFERENCE TO RELATED APPLICATIONS

This application claims priority to and the benefit of U.S. Provisional Patent Application No. 63/165,424, filed on Mar. 24, 2021, which is hereby incorporated by reference herein in its entirety.

TECHNICAL FIELD

This disclosure relates generally to a support core system, and more particularly, to a support core system for deploying a cold shrink rubber over a cable splice connection in an electrical distribution system.

BACKGROUND

Support cores are typically tubular supports that hold the elastic end of a device in an expanded state. In the context of electrical power distribution systems, support cores are often used to hold open the end of a cable splice or termination. For example, an elastic end of a splice or termination, which is designed to be disposed over the top of a terminated medium voltage electrical cable to properly insulate and shield electrical stresses between the cable and the splice or termination, may be held open by a support core. Removal of the support core causes the elastic end to bear down upon the end of the cable.

SUMMARY

The present disclosure provides, in various implementations, a cold shrink core with a polyester film for deploying a cold shrink rubber over a cable splice connection in an electrical distribution system.

According to some implementations of the present disclosure, a support core system for deploying a cold shrink rubber over a cable splice connection in an electrical distribution system is disclosed. The support core system includes a first solid core, a second solid core, and a polyethylene terephthalate (PET) film. The first solid core is configured to fit over a cable in the electrical distribution system and hold a first portion of the cold shrink rubber in an expanded state. The cable includes the cable splice connection. The second solid core is configured to fit over the cable and hold a second portion of the cold shrink rubber in an expanded state. The PET film is positioned between the cold shrink rubber and each of the first solid core and the second solid core.

In some implementations, the first solid core and the second solid core are generally tubular. In some implementations, a longitudinal dimension of the second solid core is greater than the first solid core.

In some implementations, the first portion of the cold shrink rubber is folded over itself on the first solid core such that a portion of the first solid core is exposed. In some such implementations, the second portion of the cold shrink rubber is folded over itself on the second solid core such that a portion of the second solid core is exposed. In some such implementations, the support core system further includes a protective tape wrapped over each portion of the cold shrink rubber that is folded back. In some such implementations, the support core system further includes a mastic, a release liner, or both between the protective tape and each portion of the cold shrink rubber that is folded back.

In some implementations, the first solid core includes at least two halves that are removably joined longitudinally. In some such implementations, the second solid core includes at least two halves that are removably joined longitudinally.

According to some implementations of the present disclosure, a method for deploying a cold shrink rubber over a cable splice connection in an electrical distribution system is disclosed. A support core system is placed over the cable splice connection, such that (i) a first solid core is positioned over a cable in the electrical distribution system and holds a first portion of the cold shrink rubber in an expanded state, and (ii) a second solid core is positioned over the cable and holds a second portion of the cold shrink rubber in an expanded state. The cable includes the cable splice connection. The first solid core is removed from between the first portion of the cold shrink rubber and the cable, thereby allowing the first portion of the cold shrink rubber to shrink against the cable. Aided by the shrunk first portion of the cold shrink rubber against the cable, the second solid core is removed from between the second portion of the cold shrink rubber and the cable, thereby allowing the second portion of the cold shrink rubber to shrink against the cable.

In some implementations, the second solid core is removed with less force than the first solid core. In some implementations, the first portion of the cold shrink rubber is unfolded from itself to invert a mastic and trap the mastic between the cable and the cold shrink rubber, thereby forming a waterproof seal. In some such implementations, a protective tape and a release liner are unfolded over the first portion of the cold shrink rubber that is folded back, to expose the mastic before the unfolding.

In some implementations, another protective tape and a release liner are unwrapped over the second portion of the cold shrink rubber that is folded back to expose another mastic. The second portion of the cold shrink rubber is then unfolded from itself to invert the another mastic and trap the another mastic between the cable and the cold shrink rubber, thereby forming another waterproof seal.

In some implementations, a polyethylene terephthalate (PET) film is allowed to be deployed between the cold shrink rubber and the cable. In some such implementations, prior to the removing of the first solid core and the second solid core, the PET film is positioned between the cold shrink rubber and each of the first solid core and the second solid core.

According to some implementations of the present disclosure, a support core system for deploying a cold shrink rubber over a cable splice connection in an electrical distribution system is disclosed. The support core system includes a single solid core, a pull tab attached to the solid core, and a polyethylene terephthalate (PET) film. The single solid core is configured to fit over a cable in the electrical distribution system and hold the cold shrink rubber in an expanded state. The pull tab is attached to the solid core and configured to displace or unwind the solid core relative to the cold shrink rubber and the cable. The PET film is positioned between a portion of the cold shrink rubber and the solid core. In some implementations, the solid core is a spirally-wound ribbon core.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing and other advantages of the present disclosure will become apparent upon reading the following detailed description and upon reference to the drawings.

Figure 1:
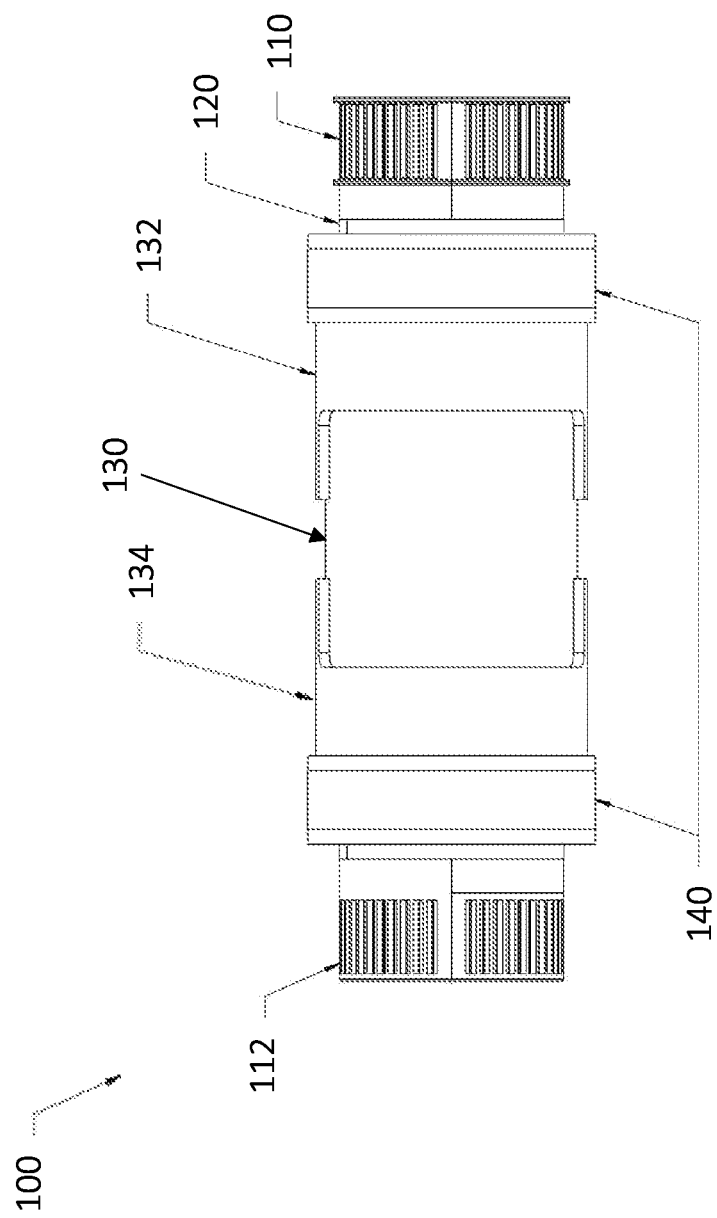
FIG. 1 shows a side view of a two-piece solid core with polyethylene terephthalate film, according to some implementations of the present disclosure.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure is described with reference to the attached figures, where like reference numerals are used throughout the figures to designate similar or equivalent elements. The figures are not drawn to scale, and are provided merely to illustrate the instant disclosure. Several aspects of the disclosure are described below with reference to example applications for illustration.

Cold shrink rubber products are commonly used in the electrical industry to cover and provide a moisture seal over cable splice connections. Cold shrink rubber products used for such applications are typically held in an expanded state by a support core. These support cores are most commonly made by spirally winding a ribbon of plastic to form a tube. When the rubber part is ready to be deployed over the cable splice, the user unwinds the plastic ribbon core to allow the rubber to shrink onto the splice. The pulling of this ribbon is done through the inner diameter (ID) of the core so that it does not get trapped by the elastic rubber that is being deployed onto the cable. The ribbon is pulled and unwound around the cable/splice until the rubber part is completely deployed. The problem with this design is that even for a very short splice, the ribbon length is significant and due to the nature of unwinding around the cable, needs to constantly be unwrapped from around the cable to continue to be able to pull and remove the core. For long cold shrink splices, this unwinding can be time consuming and cause repetitive motion injuries due to awkward hand and wrist movements.

Another style of core that exists for cold shrink applications is a solid plastic tube with a polyethylene terephthalate (PET) film wrapped around the outside. The rubber part is expanded over the top of the PET film so that the rubber is not in direct contact with the solid plastic tube. The PET film provides a low friction surface that can slide relatively easily over the outer diameter (OD) of the plastic tube. The user holds the expanded rubber part with one hand and pulls the solid plastic core out with the other, positioning the rubber onto the cable/splice. The amount of force required to remove the plastic core depends on how much force the rubber is applying on the core OD surface. As the expansion ratio increases (larger core OD to handle a larger range of cable sizes) so does the amount of force pressing against the PET film and core OD surface. As this force increases it becomes more difficult to remove the solid core by hand. A need exists for an easier to remove core design for cold shrink products.

Cold shrink seals do not form a moisture seal without the addition of mastic or other sealing material between the cable and rubber parts. The mastic is commonly applied to the cable before the core is removed from the cold shrink part so that it is trapped between the cable and cold shrink seal. Since this mastic is a loose piece, it is sometimes forgotten about or misplaced and not included when shrinking the seal, making the seal ineffective. The present disclosure addresses this problem and other problems by providing a cold shrink core with a polyester film for deploying a cold shrink rubber over a cable splice connection in an electrical distribution system.

For example, certain implementations of the present disclosure overcome problems identified above, and provide a solid tubular core comprising two sections, one long and one short, with PET film wrapped around the outside of the solid core. When the rubber splice is expanded onto the core, it is positioned so that the rubber only overlaps a small portion onto the short core end, and a majority of the rubber is over the longer core end. Because the short core does not have a long length of rubber overtop, it becomes very easy to remove, even if there is a high expansion ratio of the rubber. Once the short core end is removed and the rubber portion that it was expanding is deployed onto the cable, the rubber then helps remove the longer end by the short shrunk end gripping the cable and pushing against the inside edge of the longer core. The longer core end is then removed by hand, but is assisted by the force of the rubber pushing against the inside edge.

FIG. 1 shows a side view of a two-piece solid core with polyethylene terephthalate film, according to some implementations of the present disclosure. Specifically, a support core system 100 for deploying a cold shrink rubber 130 over a cable splice connection in an electrical distribution system is shown. The support core system 100 includes a short solid core 110, a long solid core 112, and a polyethylene terephthalate (PET) film 120. The longitudinal dimension of the long solid core 112 is greater than that of the short solid core 110. As shown, the short solid core 110 and the long solid core 112 are generally tubular.

Figure 2:
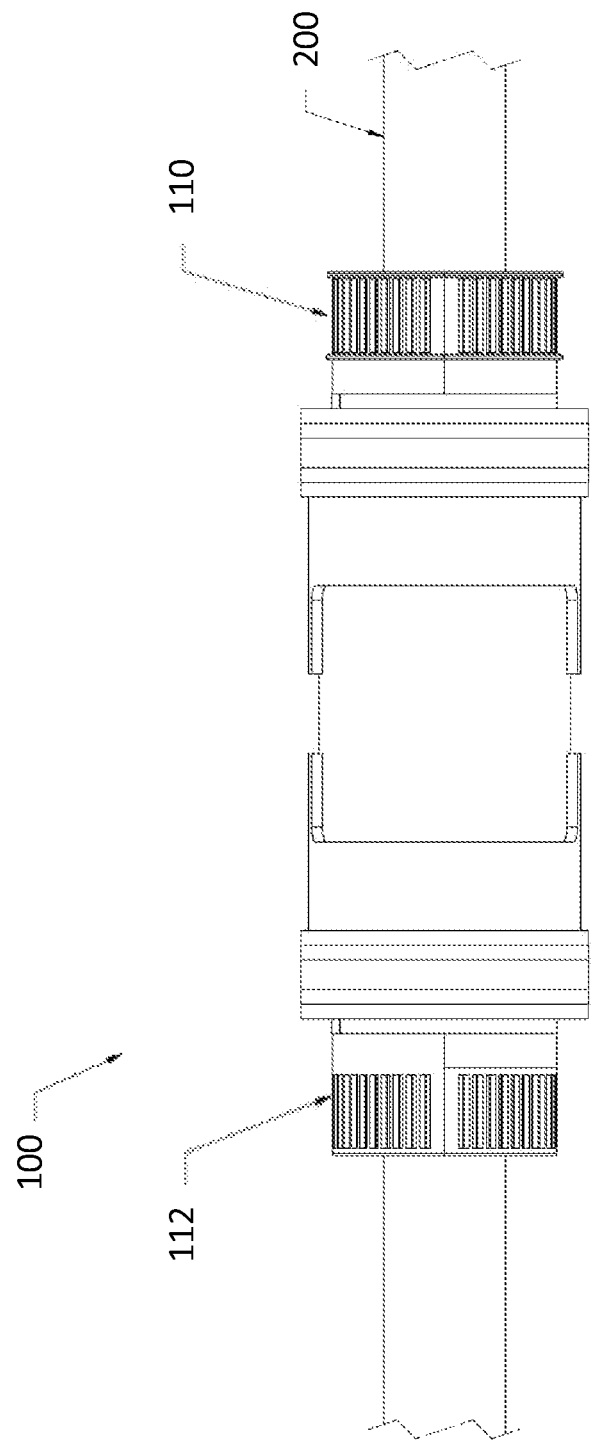
FIG. 2 shows a side view of the solid core of FIG. 1 during installation where the solid core is placed on the cable over the splice connection.

The short solid core 110 is configured to fit over a cable 200 (FIG. 2) in the electrical distribution system, and hold a first portion 132 of the cold shrink rubber 130 in an expanded state. The long solid core 112 is configured to fit over the cable 200 (FIG. 2) and hold a second portion 134 of the cold shrink rubber in an expanded state. As shown in FIG. 2, the support core system 100 is placed on the cable 200 over the splice connection. For example, the support core system 100 may be slid over the top of the connector for the cable splice.

Referring back to FIG. 2, the PET film 120 is positioned between the cold shrink rubber 130 and each of the short solid core 110 and the long solid core 112. In other words, there is PET film 120 between the short solid core 110 and the first portion 132 of the cold shrink rubber 130, and between the long solid core 112 and the second portion 134 of the cold shrink rubber 130.

Further, as shown in FIG. 1, the first portion 132 of the cold shrink rubber 130 is folded over itself on the short solid core 110, such that a portion of the short solid core 110 is exposed. Similarly, the second portion 134 of the cold shrink rubber 130 is folded over itself on the long solid core 112, such that a portion of the long solid core 112 is exposed. The support core system 100 further includes a protective tape 140 wrapped over each portion of the cold shrink rubber 130 that is folded back. In some implementations, the support core system 100 further includes a mastic 142 (FIG. 5), a release liner, or both between the protective tape 140 and each portion of the cold shrink rubber 130 that is folded back. The mastic 142 (FIG. 5) is protected during handling with the protective tape and the release liner to secure in place.

Figure 3:
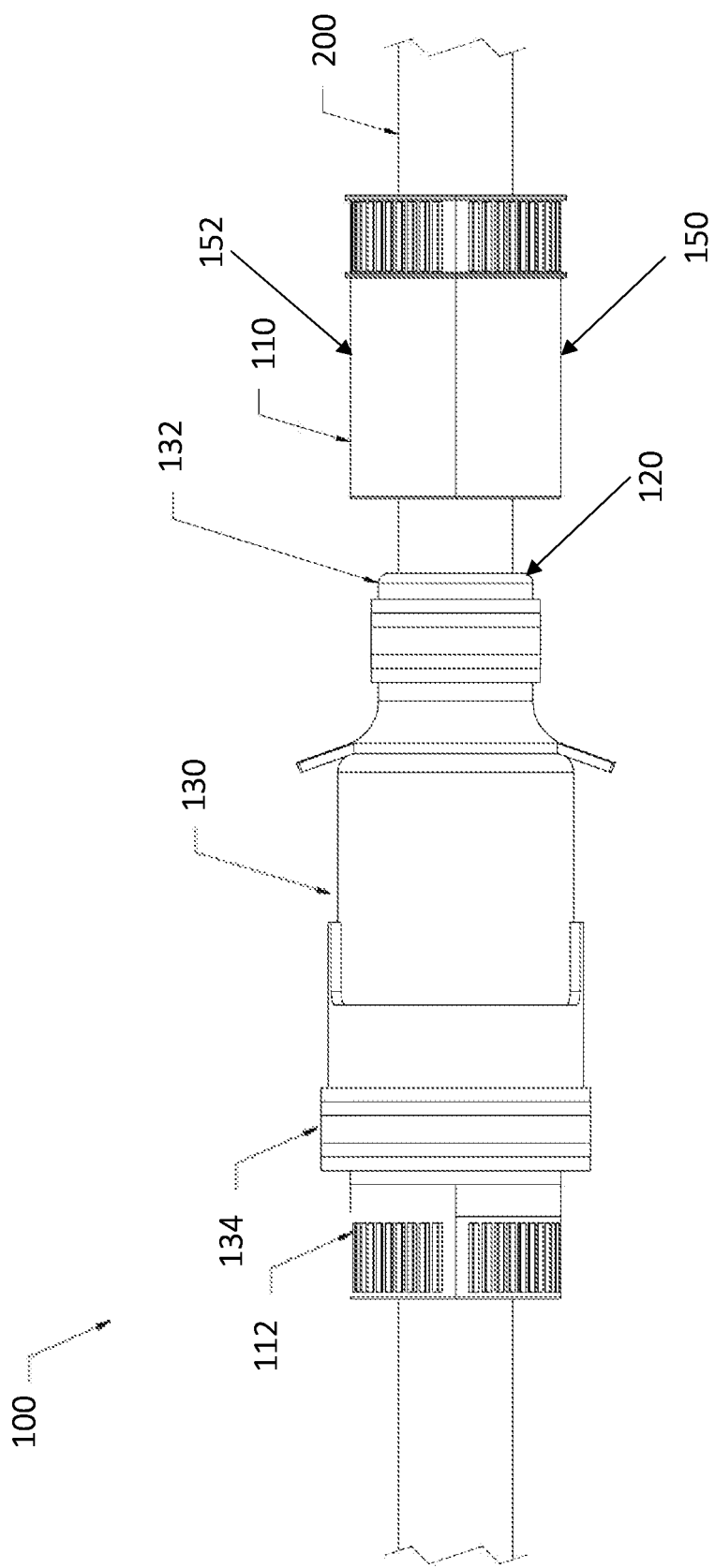
FIG. 3 shows a side view of the solid core of FIG. 1 during installation where the short core is being removed.

Referring to FIG. 3, the short solid core 110 is removed from between the first portion 132 of the cold shrink rubber 130 and the cable 200, thereby allowing the first portion 132 of the cold shrink rubber 130 to shrink against the cable 200. In some implementations, the short solid core 110 is removed by hand. In this example, the short solid core 110 includes at least two halves 150 and 152 that are removably joined longitudinally. After the short solid core 110 is removed from under the cold shrink rubber 130, the two halves 150 and 152 come apart and can be removed from the cable 200.

The PET film 120 stays in place when the short solid core 110 is removed. As the short solid core 110 is removed, the PET film 120 film stays under the first portion 132 of the cold shrink rubber 130. The PET film 120's main function is to provide a low friction surface to enable the cold shrink rubber 130 to be easily slid against the outside surface of the short solid core 110. If the cold shrink rubber 130 was in direct contact with the outside surface of the short solid core 110, it would be hardly movable.

When the cold shrink rubber 130 is expanded onto the two-piece core, it is positioned so that the cold shrink rubber 130 only overlaps a small portion onto the short solid core 110, and a majority of the cold shrink rubber 130 is over the long solid core 112. Because the short solid core 110 does not have a long length of cold shrink rubber 130 overtop, it becomes very easy to remove, even if there is a high expansion ratio of the rubber.

Once the short solid core 110 is removed and the first portion 132 of the cold shrink rubber 130 that the short solid core 110 was expanding is deployed onto the cable 200, the cold shrink rubber 130 then helps remove the long solid core 112 by the shrunk short solid core 110 gripping the cable 200 and pushing against the inside edge of the long solid core 112. The long solid core 112 can then be removed by hand, and in a similar manner as the short solid core 110, but is assisted by the force of the cold shrink rubber 130 pushing against the inside edge. Thus, in some implementations, the long solid core 112 is removed with less force than the short solid core 110, as the removal of the long solid core 112 is aided by the shrunk first portion 132 of the cold shrink rubber 130 against the cable 200.

Similarly, the PET film 120 stays in place when the long solid core 112 is removed. As the long solid core 112 is removed, the PET film 120 film stays under the second portion 134 of the cold shrink rubber 130. In some implementations, the long solid core 112 also includes at least two halves that are removably joined longitudinally, which can be removed from the cable 200 after being pulled from under the cold shrink rubber 130.

Figure 4:
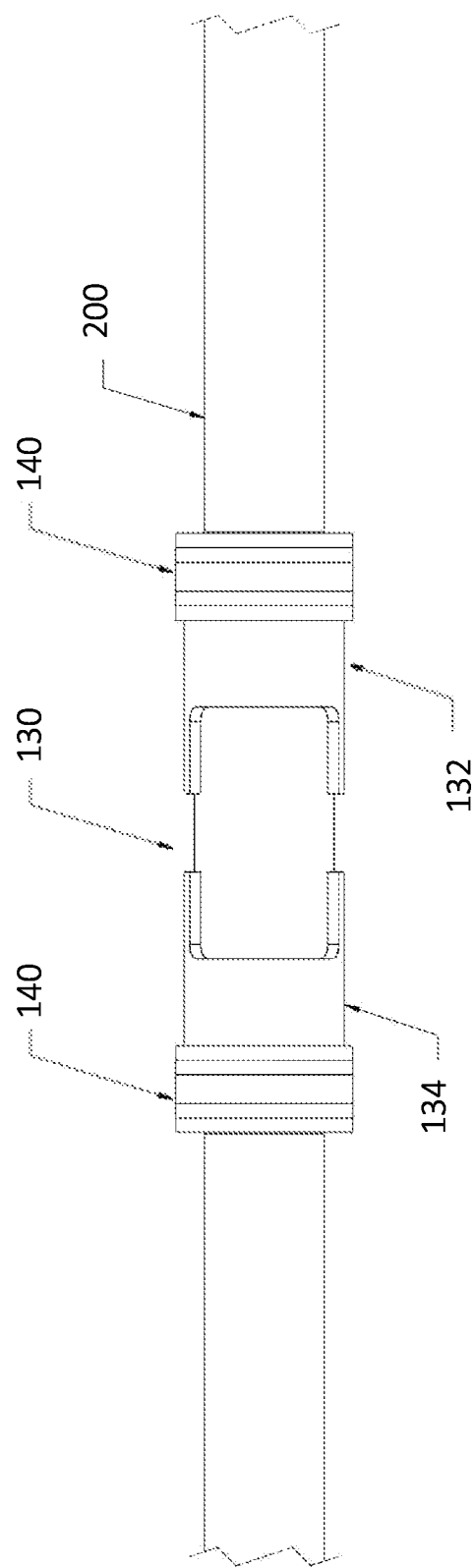
FIG. 4 shows a side view of the solid core of FIG. 1 during installation where both the short core and the long core are removed.

Referring to FIG. 4, both the short solid core 110 (FIG. 3) and the long solid core 112 (FIG. 3) have been removed from under the cold shrink rubber 130 and from the cable 200. As shown, both the first portion 132 and the second portion 134 of the cold shrink rubber 130 have shrunk against the cable 200. In some implementations, the next step is to remove the protective tape 140 from each of the first portion 132 and the second portion 134 of the cold shrink rubber 130 that is folded back.

Figure 5:
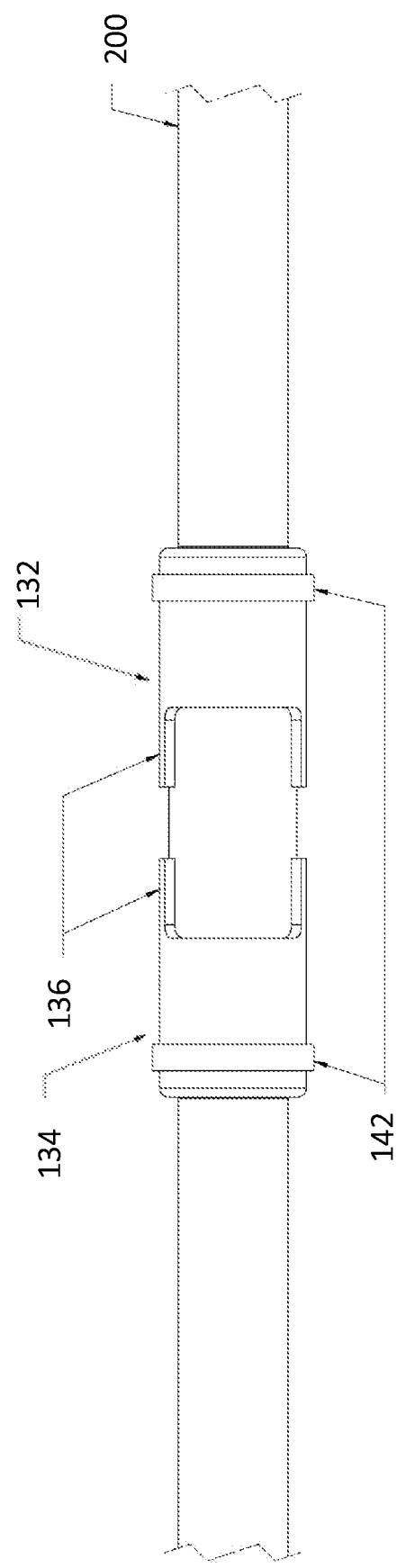
FIG. 5 shows a side view of the solid core of FIG. 1 during installation where the tape and the release liner are removed to expose the mastic.

Referring to FIG. 5, the protective tape 140 (FIG. 4) and release liner are removed from each of the first portion 132 and the second portion 134 of the cold shrink rubber 130 that is folded back to expose the mastic 142. The pull tabs 136 for the first portion 132 of the cold shrink rubber 130 may be used to unfold the first portion 132 from itself to invert the mastic 142 and trap the mastic 142 between the cable 200 and the cold shrink rubber 130, thereby forming a waterproof seal. Similarly, pull tabs 136 for the second portion 134 of the cold shrink rubber 130 may be used to unfold the second portion 134 from itself to invert the corresponding mastic 142 and trap the corresponding mastic 142 between the cable 200 and the cold shrink rubber 130, thereby forming another waterproof seal.

Figure 6:
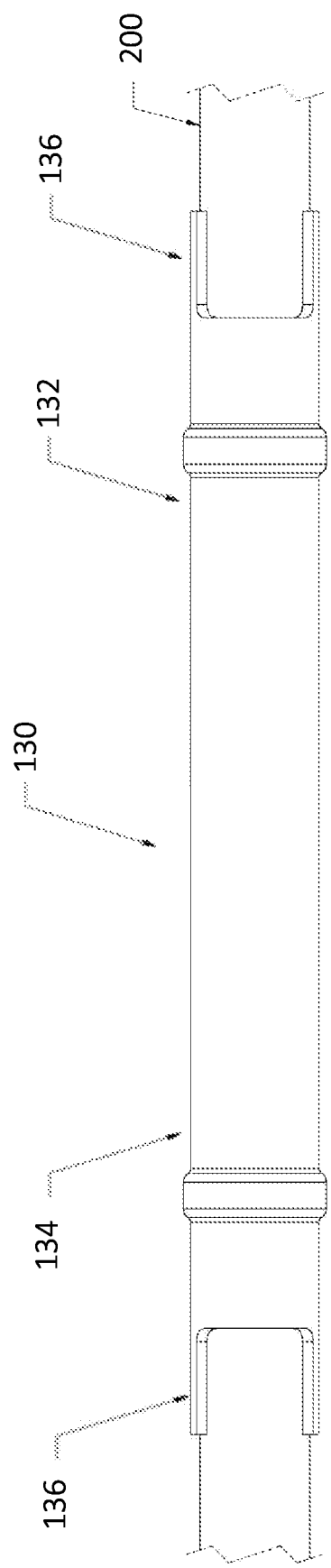
FIG. 6 shows a side view of the solid core of FIG. 1 during installation where the seals are unfolded.

Referring to FIG. 6, the first portion 132 and the second portion 134 of the cold shrink rubber 13 have been unfolded. The PET film 120 (FIG. 1) still remains between a fraction of the cold shrink rubber 130 and the cable 200. Even so, the cold shrink rubber 130 still forms a water seal because the folded back seals with pre-installed mastic 142 (FIG. 5) on both ends do not have the PET film 120 underneath. Once unfolded, the mastic 142 (FIG. 5) and the cold shrink rubber 130 in those areas are in direct contact with the cable 200, beyond the area where the PET film 120 is located. For this reason, the PET film 120 is trimmed to be very close to the folded edges of the expanded cold shrink rubber 130 prior to installation (FIG. 1).

Figure 7:
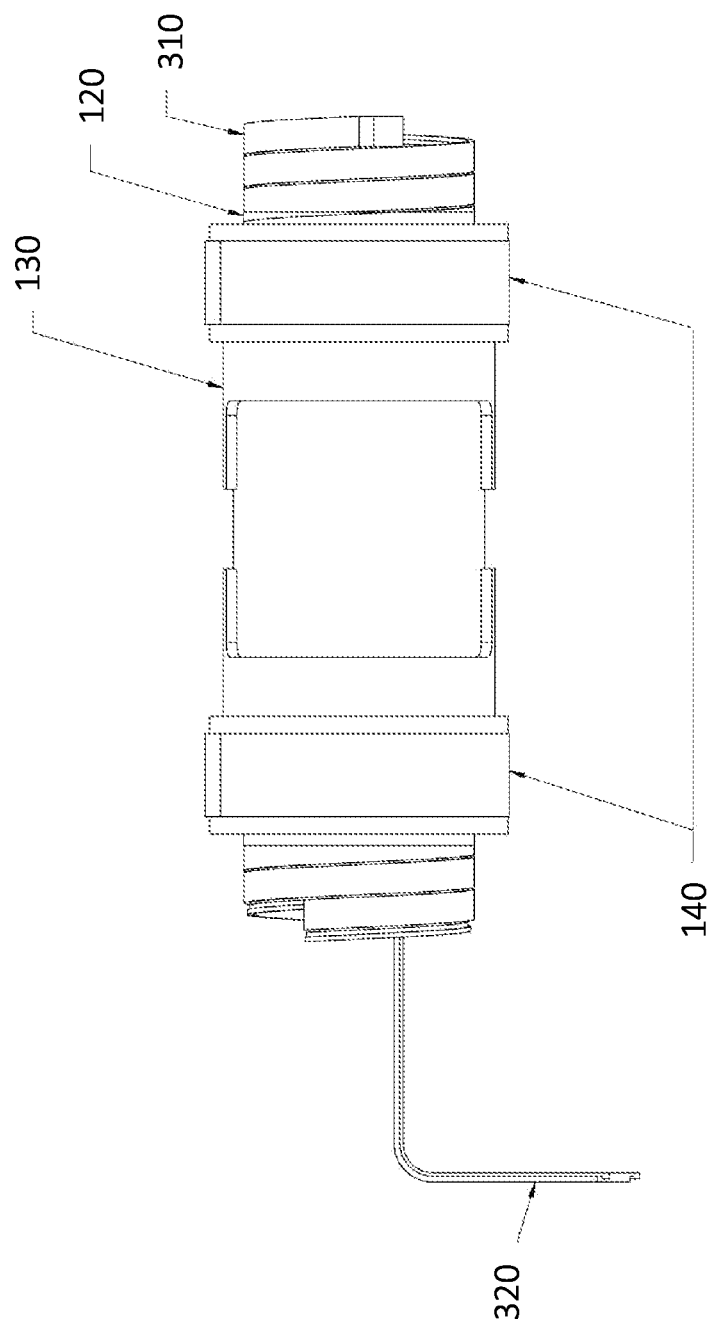
FIG. 7 shows a side view of a spiral core with polyethylene terephthalate film, according to some implementations of the present disclosure.

Referring to FIG. 7, an alternate design of the present disclosure is to wrap the PET film 120 around a spiral wound tubular core (or ribbon core) 310 and expand the cold shrink rubber 130 overtop of the PET film 120. In this configuration, the ribbon core 310 can be unwound a relatively short length, allowing one end of the cold shrink rubber 130 to be deployed onto the cable. Once one end is deployed onto the cable, which only requires a few turns of unwinding the ribbon core using a pull tab 320 (which may be an extension of the ribbon core 310), the remainder of the ribbon core 310 can be removed by hand.

The remaining steps of installation using the ribbon core 310 is the same as, or similar to, what is described relative to FIGS. 2-6 with respect to the two-piece solid core. Similar to the two-piece solid core (FIG. 1), the long length of unwound portion of the ribbon core 310 is aided in its removal by the PET film 120. Specifically, the cold shrink rubber 130 aids in gripping the cable, and pushing against the inside edge of the ribbon core 310. In some implementations, instead of a spirally-wound ribbon core, a single tubular solid core is used.

While various examples of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A support core system for deploying a cold shrink rubber over a cable splice connection in an electrical distribution system, the support core system comprising:
    a first solid core configured to fit over a cable in the electrical distribution system and hold a first portion of the cold shrink rubber in an expanded state, the cable including the cable splice connection;
    a second solid core configured to fit over the cable and hold a second portion of the cold shrink rubber in an expanded state, wherein the first solid core and the second solid core are configured to be removed from the cable while deploying the cold shrink rubber to cause the first and second portions of the cold shrink rubber to transition from the expanded state to a shrunken state surrounding the cable splice connection; and
    a polyethylene terephthalate (PET) film positioned between the cold shrink rubber and each of the first solid core and the second solid core, wherein after the first solid core and the second solid core are removed from the cable during the deploying of the cold shrink rubber, the PET film remains positioned directly against the cable splice connection and directly under the first and second portions of the cold shrink rubber in the shrunken state.

2. The support core system of claim 1, wherein the first solid core and the second solid core are generally tubular.

3. The support core system of claim 1, wherein a longitudinal dimension of the second solid core is greater than the first solid core.

4. The support core system of claim 1, wherein the first portion of the cold shrink rubber is folded over itself on the first solid core such that a portion of the first solid core is exposed.

5. The support core system of claim 4, wherein the second portion of the cold shrink rubber is folded over itself on the second solid core such that a portion of the second solid core is exposed.

6. The support core system of claim 5, further comprising a protective tape wrapped over each portion of the cold shrink rubber that is folded back.

7. The support core system of claim 6, further comprising a mastic, a release liner, or both between the protective tape and each portion of the cold shrink rubber that is folded back.

8. The support core system of claim 1, wherein the first solid core includes at least two halves that are removably joined longitudinally.

9. The support core system of claim 8, wherein the second solid core includes at least two halves that are removably joined longitudinally.

10. A support core system for deploying a cold shrink rubber over a cable splice connection in an electrical distribution system, the support core system comprising:
    a single solid core configured to fit over a cable in the electrical distribution system and hold the cold shrink rubber in an expanded state;
    a pull tab attached to the solid core and configured to displace or unwind the solid core relative to the cold shrink rubber and the cable, wherein the solid core is configured to be removed from the cable while deploying the cold shrink rubber to cause the cold shrink rubber to transition from an expanded state to a shrunken state surrounding the cable splice connection; and
    a polyethylene terephthalate (PET) film positioned between a portion of the cold shrink rubber and the solid core, wherein after the solid core is removed from the cable during the deploying of the cold shrink rubber, the PET film remains positioned directly against the cable splice connection and directly under the cold shrink rubber in the shrunken state.

11. The support core system of claim 10, wherein the solid core is a spirally-wound ribbon core.

12. A support core system for deploying a cold shrink rubber over a cable splice connection in an electrical distribution system, the support core system comprising:
    a short solid core configured to fit over a cable in the electrical distribution system and hold a first portion of the cold shrink rubber in an expanded state, the cable including the cable splice connection;
    a long solid core configured to fit over the cable and hold a second portion of the cold shrink rubber in an expanded state, the long solid core having a longitudinal length along the cable that is greater than a longitudinal length of the short solid core; and
    a film positioned under the first and second portions of the cold shrink rubber, the film having a lower coefficient of friction than the cold shrink rubber so as to allow the short solid core and the long solid core to slide out from underneath the cold shrink rubber and be removed from the cable during the deploying of the cold shrink rubber over the cable splice connection, the first portion and the second portion of the cold shrink rubber transitioning from the expanded state to a shrunken state after removal of the short solid core and the long solid core, the film remaining over the cable splice connection and under the cold shrink rubber in the shrunken state after removal of the short solid core and the long solid core.

13. The support core system of claim 12, wherein the short solid core includes at least two halves that are removably joined longitudinally.

14. The support core system of claim 13, wherein the long solid core includes at least two halves that are removably joined longitudinally.

15. The support core system of claim 12, wherein the short solid core and the long solid core are generally tubular.

16. The support core system of claim 12, wherein the first portion of the cold shrink rubber is arranged such that a portion of the short solid core is exposed and the second portion of the cold shrink rubber is arranged such that a portion of the long solid core is exposed.

17. The support core system of claim 16, wherein the first portion of the cold shrink rubber is folded over itself and the second portion of the cold shrink rubber is folded over itself.

18. The support core system of claim 17, further comprising a protective tape wrapped over each portion of the cold shrink rubber that is folded over itself.

19. The support core system of claim 18, further comprising a mastic, a release liner, or both between the protective tape and each portion of the cold shrink rubber that is folded over itself.

\* \* \* \* \*

UNITED STATES PATENT AND TRADEMARK OFFICE
CERTIFICATE OF CORRECTION

PATENT NO. : 11,888,278 B2
APPLICATION NO. : 17/656099
DATED : January 30, 2024
INVENTOR(S) : Christopher A. Juillet, Bruce Bier and Jeffrey Madden It is certified that error appears in the above-identified patent and that said Letters Patent is hereby corrected as shown below:

On the Title Page

At (73) Assignee, after "Richards Mfg. Co." please insert --, A New Jersey Limited Partnership--.

Signed and Sealed this
Twenty-seventh Day of February, 2024

Katherine Kelly Vidal
*Director of the United States Patent and Trademark Office*